(12) United States Patent
Maeda et al.

(10) Patent No.: US 12,212,218 B2
(45) Date of Patent: Jan. 28, 2025

(54) POWER TRANSMISSION DEVICE

(71) Applicant: JATCO Ltd, Fuji (JP)

(72) Inventors: Atsushi Maeda, Hadano (JP); Ryoichi Mizokami, Zama (JP); Masaomi Morishita, Odawara (JP); Masahiro Kosaka, Ebina (JP)

(73) Assignee: JATCO LTD, Fuji (JP)

( * ) Notice: Subject to any disclaimer, the term of this patent is extended or adjusted under 35 U.S.C. 154(b) by 253 days.

(21) Appl. No.: 17/798,994

(22) PCT Filed: Nov. 10, 2020

(86) PCT No.: PCT/JP2020/041807
§ 371 (c)(1),
(2) Date: Aug. 11, 2022

(87) PCT Pub. No.: WO2021/161596
PCT Pub. Date: Aug. 19, 2021

(65) Prior Publication Data
US 2023/0074909 A1   Mar. 9, 2023

(30) Foreign Application Priority Data
Feb. 12, 2020   (JP) ................. 2020-021657

(51) Int. Cl.
*H02K 9/19*   (2006.01)
*B60K 6/40*   (2007.10)

(52) U.S. Cl.
CPC ............... *H02K 9/19* (2013.01); *B60K 6/40* (2013.01)

(58) Field of Classification Search
None
See application file for complete search history.

(56) References Cited

U.S. PATENT DOCUMENTS

| | | | |
|---|---|---|---|
| 2013/0020143 A1 | 1/2013 | Kishikawa | |
| 2019/0376512 A1 | 12/2019 | Kobayashi et al. | |
| 2023/0074909 A1* | 3/2023 | Maeda | B60K 6/365 |

FOREIGN PATENT DOCUMENTS

| | | |
|---|---|---|
| JP | H04-024645 U | 2/1992 |
| JP | H04-082304 U | 7/1992 |
| JP | 2006-325369 A | 11/2006 |
| JP | 2013-023121 A | 2/2013 |
| JP | 2015-211543 A | 11/2015 |
| JP | 2016-203760 A | 12/2016 |
| WO | WO-2018/159471 A1 | 9/2018 |

* cited by examiner

*Primary Examiner* — Bernard Rojas
(74) *Attorney, Agent, or Firm* — Foley & Lardner LLP

(57) ABSTRACT

A device includes a rotary electric machine, a liquid supply member configured to supply liquid to the rotary electric machine, and a facing member facing the rotary electric machine in an axial direction with the liquid supply member interposed therebetween. The liquid is supplied to the liquid supply member via the facing member.

4 Claims, 5 Drawing Sheets

POWER TRANSMISSION DEVICE

TECHNICAL FIELD

The present invention relates to a device.

BACKGROUND ART

JP2015-211543A discloses a cooling structure for a rotary electric machine that supplies cooling oil or the like to the rotary electric machine using a refrigerant passage pipe.

SUMMARY OF INVENTION

In the structure disclosed in JP2015-211543A, a supply port of the refrigerant passage pipe is protruded from an outer periphery of a stator, thereby enabling liquid such as the cooling oil to be supplied to the refrigerant passage pipe. Therefore, there is a problem that it is difficult to realize miniaturization of an entire device including the rotary electric machine.

The invention is made in view of such a technical problem, and an object of the invention is to realize miniaturization of a device having a structure that supplies liquid to the rotary electric machine.

According to one aspect of the present invention, a device includes a rotary electric machine, a liquid supply member configured to supply liquid to the rotary electric machine, and a facing member facing the rotary electric machine in an axial direction with the liquid supply member interposed therebetween. The liquid is supplied to the liquid supply member via the facing member.

Accordingly, since the liquid can be supplied to the liquid supply member via the facing member that faces the rotary electric machine in the axial direction, protrusion of the liquid supply member to an outer peripheral side of the rotary electric machine can be suppressed. Therefore, the device can be miniaturized.

DESCRIPTION OF EMBODIMENTS

Hereinafter, a hybrid vehicle 100 (hereinafter, simply referred to as a "vehicle") including a power transmission device 10 as a device according to an embodiment of the invention will be described with reference to the accompanying drawings.

Figure 1:
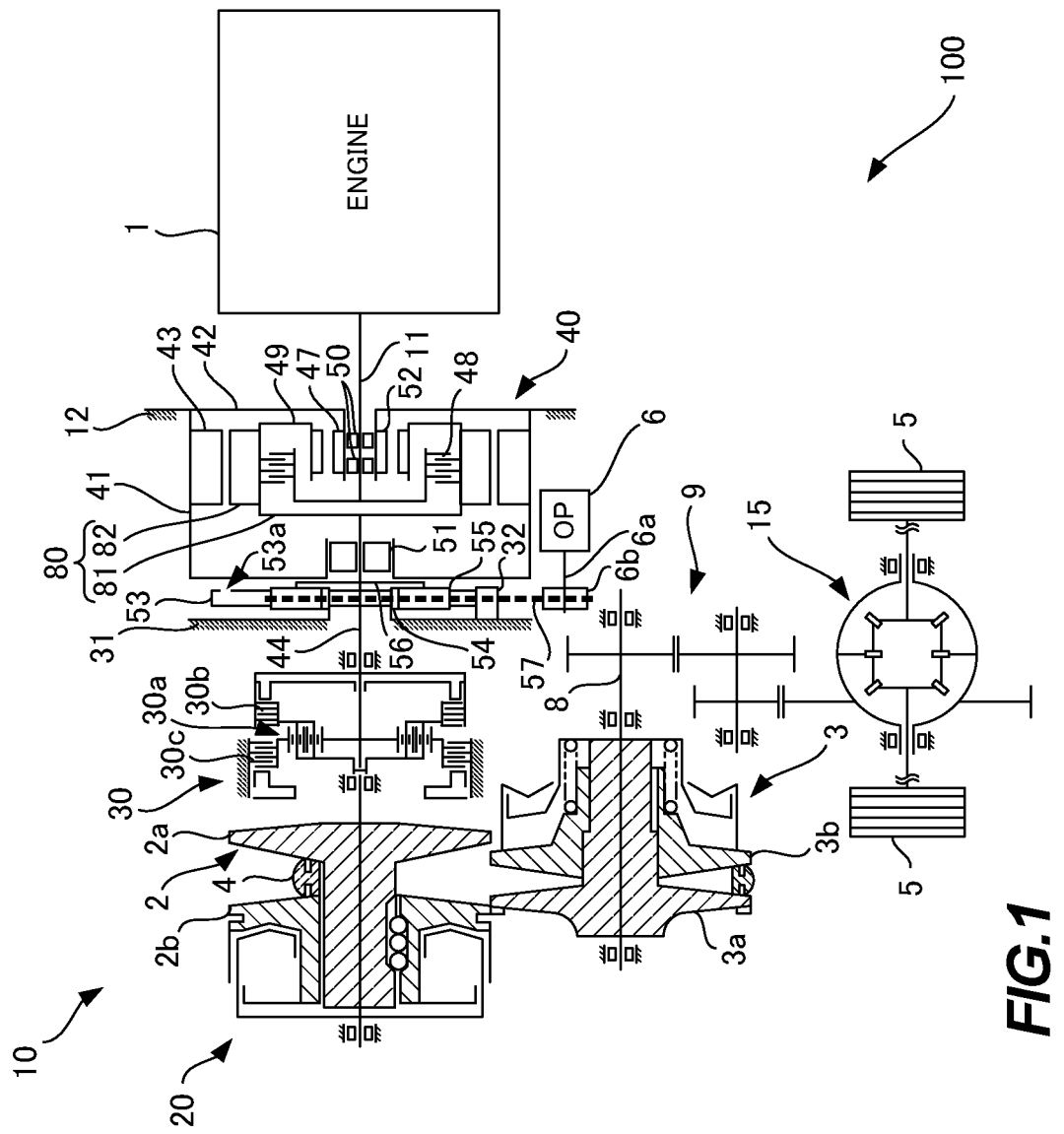
FIG. 1 is a schematic configuration diagram of a hybrid vehicle including a device according to an embodiment of the invention.

FIG. 1 is a schematic configuration diagram of the vehicle 100. As illustrated in FIG. 1, the vehicle 100 includes an engine 1, and the power transmission device 10 provided in a power transmission path connecting the engine 1 and driving wheels 5.

In the present embodiment, the power transmission device 10 is a transmission, and includes a variator 20, a forward/reverse switching mechanism 30, and a rotary electric machine 40.

The rotary electric machine 40 is provided between the variator 20 and the engine 1 in the power transmission path.

The rotary electric machine 40 includes: a housing 41; a cover 42 provided for an opening portion of the housing 41 on an engine 1 side; a stator 43 provided on an inner periphery of the housing 41; a rotary shaft 44; a rotor 80 provided on an outer periphery of the rotary shaft 44; a rotation sensor 47 provided in the cover 42; and a clutch 48 that connects and disconnects the rotor 80 and an input shaft 11. The rotor 80 includes a rotor frame 81 and a core 82 provided on an outer periphery of the rotor frame 81.

The rotary electric machine 40 is fixed to the power transmission device 10 by coupling the cover 42 to a case 12 of the power transmission device 10 with bolts (not illustrated).

The input shaft 11 is rotatably supported by the cover 42 via a bearing 50, and output rotation of the engine 1 is input to the input shaft 11. The rotary shaft 44 is rotatably supported by the housing 41 via a bearing 51.

The clutch 48 is a normally open hydraulic clutch. Engagement and disengagement of the clutch 48 are controlled by a hydraulic pressure regulated by a hydraulic control valve unit (not illustrated). In the present embodiment, the clutch 48 is a wet multi-plate clutch, but other clutches may be used.

When the clutch 48 is engaged, the input shaft 11 and the rotor 80 are directly connected to each other. That is, the input shaft 11 and the rotary shaft 44 are directly connected to each other and rotate at the same speed.

The rotation sensor 47 is a sensor that detects at least one of a rotation speed and an angle (phase) of the rotary electric machine 40. In the present embodiment, the rotation sensor 47 is a Hall sensor, and a magnet 52 as a portion to be detected of the rotation sensor 47 is attached to a holding member 49 fixed to the rotor 80.

As the rotation sensor 47, another sensor that detects the rotation speed or another sensor that detects the angle may be used. The magnet 52 is a permanent magnet, an electromagnet, or the like. When an electromagnet is used, a current may be supplied to the electromagnet using a slip ring or the like.

The rotary electric machine 40 can operate as an electric motor that is rotationally driven by receiving electric power supplied from a battery (not illustrated). When the rotor 80 receives rotational energy from the driving wheels 5, the rotary electric machine 40 functions as a generator and can charge a battery. A configuration of the rotary electric machine 40 will be described in detail later.

The variator 20 includes a primary pulley 2 and a secondary pulley 3 that are arranged such that V-shaped grooves are aligned, and a belt 4 that is wound around the V-shaped grooves of the pulleys 2 and 3.

The engine 1 is disposed coaxially with the primary pulley 2, and the rotary electric machine 40 and the forward/reverse switching mechanism 30 are provided between the engine 1 and the primary pulley 2 in this order from the engine 1 side.

The forward/reverse switching mechanism 30 includes a double pinion planetary gear set 30a as a main component, a sun gear thereof is coupled to the rotary shaft 44 of the rotary electric machine 40, and a carrier thereof is coupled to the primary pulley 2 of the variator 20. The forward/reverse switching mechanism 30 further includes: a forward clutch 30b that directly connects the sun gear and the carrier of the double pinion planetary gear set 30a; and a reverse brake 30c that fixes a ring gear. When the forward clutch 30b is engaged, input rotation from the rotary shaft 44 is transmitted to the primary pulley 2 without changing a rotation direction, and when the reverse brake 30c is engaged, the input rotation from the rotary shaft 44 is reversed and is transmitted to the primary pulley 2.

The forward clutch 30b is engaged by a clutch pressure supplied from the hydraulic control valve unit when a forward traveling mode is selected as a traveling mode of the vehicle 100. The reverse brake 30c is engaged by a brake pressure supplied from the hydraulic control valve unit when a reverse traveling mode is selected as the traveling mode of the vehicle 100.

Rotation of the primary pulley 2 is transmitted to the secondary pulley 3 via the belt 4, and rotation of the secondary pulley 3 is transmitted to the driving wheels 5 via an output shaft 8, a gear set 9, and a differential gear unit 15.

In order to make it possible to change a speed ratio between the primary pulley 2 and the secondary pulley 3 during the above-mentioned power transmission, among conical plates forming the V-shaped grooves of the primary pulley 2 and the secondary pulley 3, a part of the conical plates are referred to as fixed conical plates 2a and 3a, and the other part of the conical plates are referred to as movable conical plates 2b and 3b that can be displaced in an axial direction.

These movable conical plates 2b and 3b are biased toward the fixed conical plates 2a and 3a by supplying a primary pulley pressure and a secondary pulley pressure from the hydraulic control valve unit, and thus the belt 4 is frictionally engaged with the conical plates to perform power transmission between the primary pulley 2 and the secondary pulley 3.

At the time of gear shift, widths of the V-shaped grooves of both the pulleys 2 and 3 are changed by a differential pressure between the primary pulley pressure and the secondary pulley pressure generated corresponding to a target speed ratio, and the target speed ratio is implemented by continuously changing an arc diameter of the belt 4 wound around the pulleys 2 and 3.

Between the rotary electric machine 40 and the forward/reverse switching mechanism 30, an arc-shaped pipe 53 as a liquid supply member, and an intermediate cover 31 as a facing member that covers a rotary electric machine 40 side of the forward/reverse switching mechanism 30 and faces the rotary electric machine 40 in an axial direction with the pipe 53 interposed therebetween are provided.

A sprocket 55 is rotatably supported by the intermediate cover 31 via a bush 54. The sprocket 55 is connected to the rotary shaft 44 of the rotary electric machine 40 via a connecting member 56, and the sprocket 55 is further connected to a sprocket 6b provided on an input shaft 6a of an oil pump 6 by a chain 57. As a result, when the rotary electric machine 40 rotates, the oil pump 6 is driven to supply oil to the hydraulic control valve unit.

Figure 2:
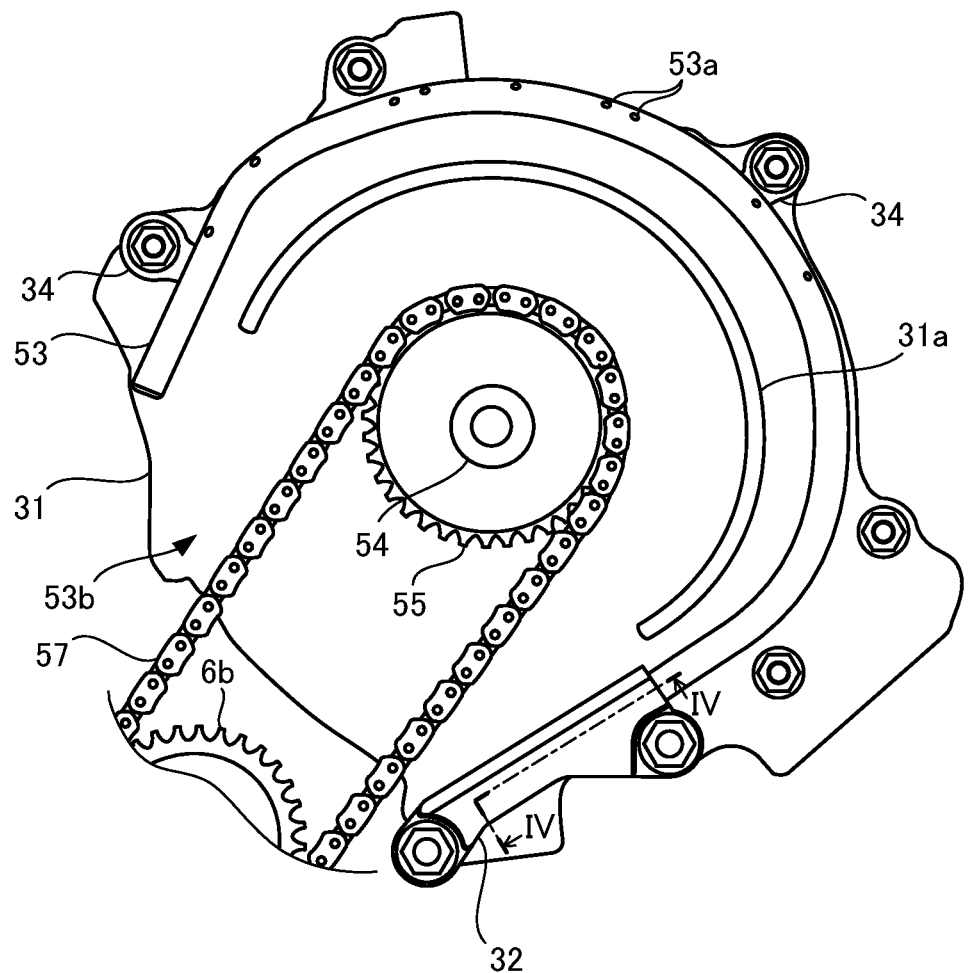
FIG. 2 is a view of an intermediate cover, a pipe, and a chain as viewed from a rotary electric machine side.
Figure 3:
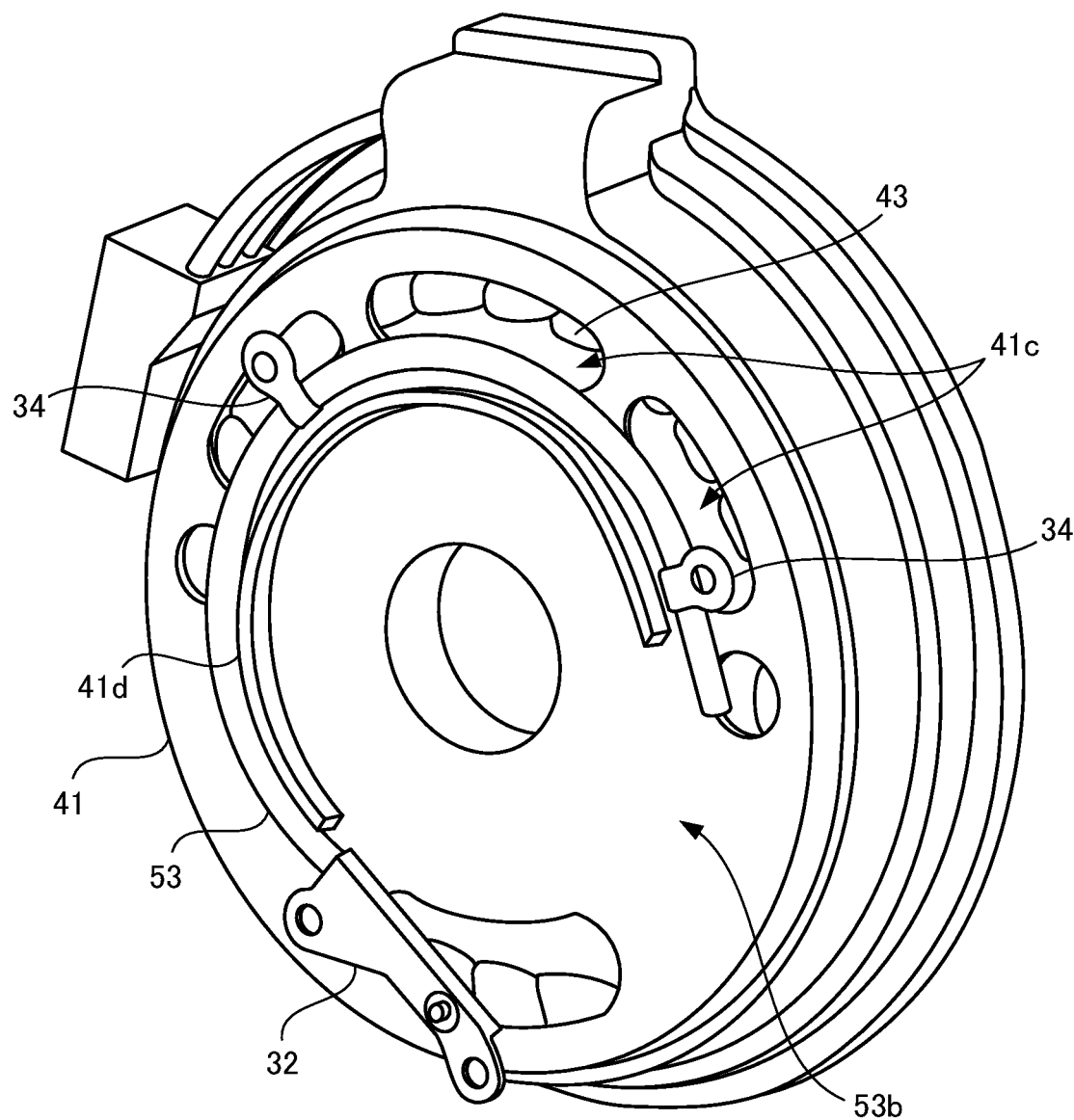
FIG. 3 is a perspective view of a housing and the pipe.

FIG. 2 is a view of the intermediate cover 31, the pipe 53, and the chain 57 as viewed from the rotary electric machine 40 side. FIG. 3 is a perspective view of the housing 41 and the pipe 53.

As illustrated in FIGS. 2 and 3, the pipe 53 extends along a peripheral direction of the rotary electric machine 40 in a curved shape that projects upward, and is provided with a notch portion 53b on a lower side. As illustrated in FIG. 2, a plurality of holes 53a are provided in a side surface of the pipe 53 on the rotary electric machine 40 side. A shape of the pipe 53 may be a curved shape that projects upward, and may be, for example, an arc shape, an elliptical arc shape, or the like.

A plurality of clamps 34 are attached to the pipe 53. The pipe 53 is fixed to the case 12 by fastening the plurality of clamps 34 together with the intermediate cover 31.

The pipe 53 is connected to an oil passage 31c provided inside the intermediate cover 31 via an intermediate member 32 (see FIG. 4), and oil as liquid supplied from the intermediate cover 31 is ejected from the plurality of holes 53a toward the rotary electric machine 40. The intermediate member 32 will be described in detail later.

As illustrated in FIG. 3, a plurality of holes 41c are formed along the peripheral direction on a surface of the housing 41 facing the intermediate cover 31, and the oil ejected from the plurality of holes 53a of the pipe 53 is directly sprayed to a coil of the stator 43 through the plurality of holes 41c. As a result, the oil can be supplied to the rotary electric machine 40 from above, and the rotary electric machine 40 can be efficiently cooled. A shape of the hole 41c and the number of holes 41c can be changed as appropriate.

In this way, in the present embodiment, the oil can be supplied to the pipe 53 via the intermediate cover 31 that faces the rotary electric machine 40 in the axial direction, so that protrusion of the pipe 53 to an outer peripheral side of the rotary electric machine 40 as viewed from the axial direction can be suppressed. Therefore, the power transmission device 10 can be miniaturized. It can be said that the pipe 53 can also be prevented from protruding from the outer periphery of the rotary electric machine 40 as viewed in the axial direction, which is more preferable from a viewpoint of miniaturizing the power transmission device 10.

In addition, by adopting a configuration in which the oil is supplied from the intermediate cover 31 to the pipe 53 via the intermediate member 32, a direction of the oil passage can be changed by the intermediate member 32. In other words, the intermediate member 32 includes at least a first oil passage and a second oil passage intersecting with the first oil passage. Therefore, a degree of freedom in designing various members can be increased, for example, the pipe 53 can be made into a simple shape without being bent in the middle. Since the degree of freedom in designing various members is increased, the miniaturization of the power transmission device 10 is facilitated.

In the present embodiment, as illustrated in FIG. 1, the bush 54, the sprocket 55, and the chain 57 are provided at positions overlapping the pipe 53 in the radial direction, and as illustrated in FIG. 2, the chain 57 is disposed so as to extend from an inner peripheral side of the arc-shaped pipe 53 to an outer peripheral side of the pipe 53 through the notch portion 53b of the pipe 53. The expression "overlapping . . . in the radial direction" means that at least a part of each of the bush 54, the sprocket 55, and the chain 57 is disposed to overlap the pipe 53 when viewed in the radial direction.

As described above, the pipe 53 supplies the oil to an upper side of the rotary electric machine 40. Therefore, there is no need to provide the pipe 53 over an entire periphery in the peripheral direction. That is, the notch portion 53b of the pipe 53 can be enlarged. Accordingly, the chain 57 can be disposed so as to pass through the notch portion 53b, and the sprocket 55, a part of the chain 57, and the like can be disposed on the inner peripheral side of the pipe 53. Therefore, an overall size of the power transmission device 10 can be suppressed.

As illustrated in FIG. 2, the intermediate cover 31 includes an arc-shaped rib 31a provided along the pipe 53, and as illustrated in FIG. 3, the housing 41 includes an arc-shaped rib 41d provided along the pipe 53.

The rib 31a of the intermediate cover 31 and the rib 41d of the housing 41 are configured such that the rib 31a is fitted to an inside of the rib 41d in a state in which the rotary electric machine 40 is assembled to the case 12. As a result, the rib 31a and the rib 41d form a partition wall portion 35 that surrounds the chain 57 and separates the pipe 53 and the chain 57 from each other (see FIG. 5).

Accordingly, oil flowing down from the pipe 53 and the housing 41 can be prevented from adhering to the chain 57, and driving efficiency of the chain 57 can be prevented from being reduced due to agitating resistance of the oil.

The vehicle 100 is configured as described above, and includes, as traveling modes, an EV mode in which the rotary electric machine 40 is driven by electric power supplied from the battery and the vehicle 100 travels based on a driving force of only the rotary electric machine 40, an engine traveling mode in which the vehicle 100 travels based on a driving force of only the engine 1, and an HEV mode in which the vehicle 100 travels based on the driving force of the engine 1 and the driving force of the rotary electric machine 40.

In the EV mode, the vehicle 100 travels by driving only the rotary electric machine 40 with electric power from the battery in a state in which the clutch 48 is released and any of the forward clutch 30b and the reverse brake 30c is engaged.

In the engine traveling mode, the vehicle 100 travels by driving only the engine 1 in a state in which the clutch 48 is engaged and any of the forward clutch 30b and the reverse brake 30c is engaged.

In the HEV mode, the vehicle 100 travels by driving the engine 1 and the rotary electric machine 40 in a state in which the clutch 48 is engaged and any of the forward clutch 30b and the reverse brake 30c is engaged.

Figure 4:
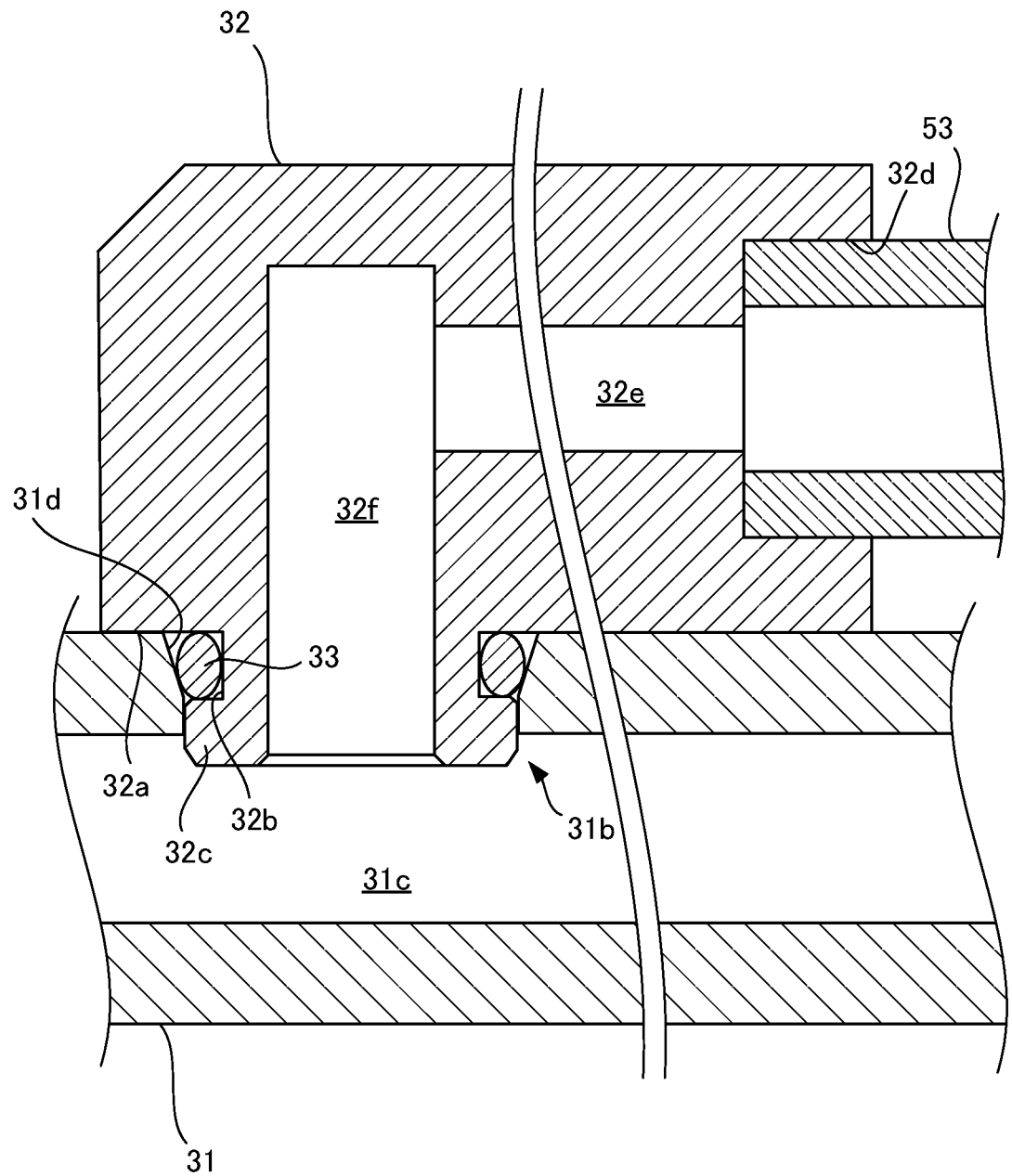
FIG. 4 is a cross-sectional view taken along a line IV-IV in FIG. 2.

Next, the intermediate member 32 will be described in detail with reference to FIG. 4. FIG. 4 is a cross-sectional view taken along a line IV-IV in FIG. 2.

The intermediate member 32 includes: a regulating portion 32a that is in contact with a surface of the intermediate cover 31; a seal ring groove 32b that is adjacent to the regulating portion 32a and holds a seal ring 33; a flange-shaped tip end portion 32c that is adjacent to the seal ring groove 32b; a pipe hole 32d into which the pipe 53 is inserted; an oil passage 32e as the first oil passage having one end opened to a bottom surface of the pipe hole 32d; an oil passage 32f as the second oil passage whose one end side is in communication with the oil passage 32e and whose the other end is opened to an end surface of the tip end portion 32c.

The pipe 53 is inserted into the pipe hole 32d, and is fixed to the intermediate member 32 by, for example, brazing, welding, or the like. The pipe 53 can also be fixed to the pipe hole 32d by press-fitting. The seal ring 33 is, for example, an O-ring or the like.

The intermediate member 32 is inserted into the intermediate cover 31. Specifically, the intermediate member 32 is fastened together with the intermediate cover 31 and fixed to the case 12 in a state in which the tip end portion 32c is inserted into an accommodation hole 31b provided in the intermediate cover 31.

In a state in which the intermediate member 32 is attached to the intermediate cover 31, as illustrated in FIG. 4, the regulating portion 32a is in contact with the surface of the intermediate cover 31, and the tip end portion 32c is located at a position where the tip end portion 32c is accommodated in the accommodation hole 31b. The expression that "the tip end portion 32c is accommodated in the accommodation hole 31b" means that at least a part of the tip end portion 32c is accommodated in the accommodation hole 31b. As a result, the seal ring 33 is held at a position where the seal ring 33 is in contact with an inner wall of the accommodation hole 31b, so that sealing performance between the intermediate cover 31 and the intermediate member 32 can be ensured.

For example, it is also considered that the seal ring 33 is held by providing a counterbore in the intermediate cover 31, but in that case, a length in the axial direction of a configuration that holds the seal ring 33 is increased. Therefore, as a result, a length of the intermediate cover 31 in the axial direction, that is, a thickness of the intermediate cover 31 may be increased. In contrast, the thickness of the intermediate cover 31 can be reduced by providing the tip end portion 32c that holds the seal ring 33 in the intermediate member 32.

In the present embodiment, a seal surface 31d of the accommodation hole 31b of the intermediate cover 31, with which the seal ring 33 is in contact, has a tapered shape expanding toward the intermediate member 32. That is, the seal surface 31d is an inclined surface.

From a viewpoint of attachment performance of the seal ring 33, it is considered that an inclined surface is provided at an inlet portion of the accommodation hole 31b. However, when only the inlet portion is made into an inclined surface, there is a boundary between the inclined surface and the seal surface, and it is considered that the seal ring 33 is to be damaged when attaching the seal ring 33. Therefore, as illustrated in FIG. 4, it is preferable that not only the inlet portion but also an entire portion from the inlet portion to a portion with which the seal ring 33 is in contact are made into an inclined surface.

Figure 5:
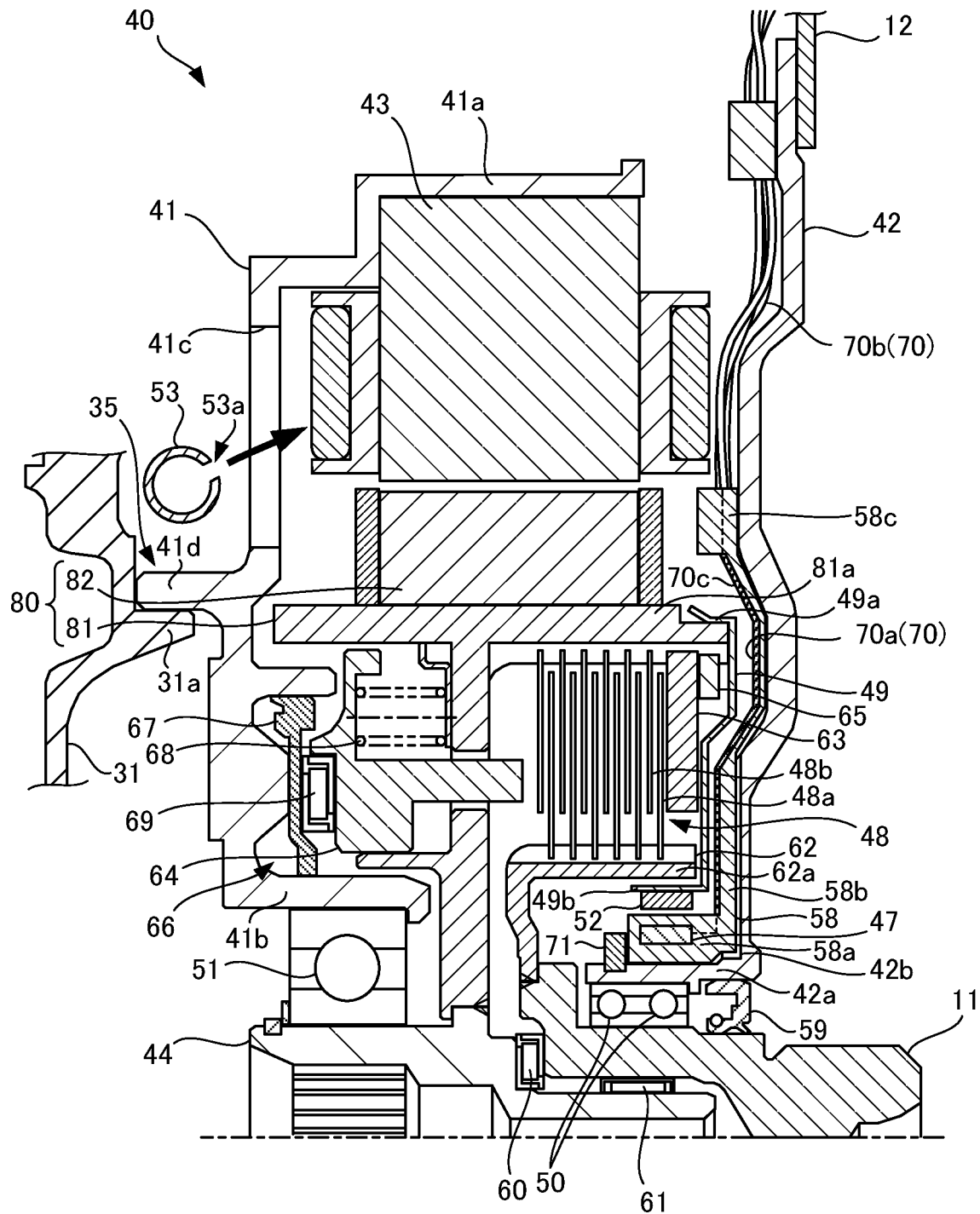
FIG. 5 is a cross-sectional view of the rotary electric machine.

Next, a configuration of the rotary electric machine 40 will be described in detail with reference to FIG. 5. FIG. 5 is a cross-sectional view of the rotary electric machine 40.

The housing 41 includes: a tubular portion 41a that is provided on an outer peripheral side; a tubular portion 41b that is provided on an inner peripheral side and extends toward an inside of the housing 41; the plurality of holes 41c; and the rib 41d.

The stator 43 is fixed to an inner periphery of the tubular portion 41a. The tubular portion 41b rotatably supports the rotary shaft 44 via the bearing 51.

The rib 41d forms, together with the rib 31a of the intermediate cover 31, the partition wall portion 35 that separates the pipe 53 and the chain 57 from each other.

The plurality of holes 41c are formed in a surface of the housing 41 facing the pipe 53. As a result, as indicated by an arrow, the oil ejected from the plurality of holes 53a of the pipe 53 is directly sprayed to the coil of the stator 43 through the plurality of holes 41c.

The outer peripheral side of the cover 42 is fixed to the case 12 of the power transmission device 10. The cover 42 includes a tubular portion 42a that is provided on an inner peripheral side and extends toward the housing 41.

A holder 58 in which the rotation sensor 47 is accommodated is fixed to an outer periphery of the tubular portion 42a. The tubular portion 42a rotatably supports the input shaft 11 via the bearing 50.

The holder 58 includes: an annular portion 58a that holds the rotation sensor 47 therein; a support portion 58b that extends in a radial direction from the annular portion 58a, and a conversion portion 58c that is provided at a tip end of the support portion 58b.

An electric wire 70 connected to the rotation sensor 47 includes a film-shaped portion 70a and a cable 70b. The film-shaped portion 70a and the cable 70b are connected to each other in the conversion portion 58c.

The film-shaped portion 70a is provided on a flexible printed circuit board 70c fixed to the support portion 58b.

The holder 58 is attached to the cover 42 by inserting the tubular portion 42a of the cover 42 into the annular portion 58a.

As a result, the holder 58 is provided adjacent to a rotating body such as the rotor 80 and the holding member 49 in the axial direction. The expression "adjacent to . . . in the axial direction" means that two members are disposed adjacent to each other in the axial direction without another member interposed therebetween, and the two members may be in contact with each other or may be disposed with a gap therebetween.

A ring 71 fixed to a groove is provided on the outer periphery of the tubular portion 42a closer to a tip end side than the holder 58 so as to overlap with the annular portion 58a in the axial direction. The expression "overlap . . . in the axial direction" means that at least a part of the ring 71 is disposed to overlap with the annular portion 58a when viewed in the axial direction. Therefore, movement of the holder 58 toward the tip end side of the tubular portion 42a is regulated by the ring 71. As a result, the holder 58 can be prevented from falling off from the tubular portion 42a.

A groove 42b that extends in the radial direction from a base end portion of the tubular portion 42a is formed in the cover 42. The support portion 58b of the holder 58 is formed along an inner wall of the cover 42, and when the holder 58 is attached to the cover 42, the support portion 58b is fitted into the groove 42b. In this way, by accommodating the support portion 58b that extends in the radial direction in the groove 42b that extends in the radial direction, rotation of the holder 58 in the peripheral direction can be regulated. Accordingly, a distance between the cover 42 and the rotating body such as the rotor 80 and the holding member 49 in the axial direction can be reduced as compared with a case in which the groove 42b is not provided in the cover 42.

The rotating body is not limited as long as being a member that rotates. For example, the holding member 49 of the magnet 52, which is the portion to be detected of the rotation sensor 47, the clutch 48, the rotor 80 of the rotary electric machine 40, and the like are rotating bodies.

A seal member 59 for preventing leakage of oil to the outside is provided between the tubular portion 42a and the input shaft 11.

A needle bearing 60 that receives an axial load and a needle bearing 61 that receives a radial load are provided between the input shaft 11 and the rotary shaft 44.

A clutch hub 62 is fixed to an end portion of the input shaft 11 on a forward/reverse switching mechanism 30 side by welding. The clutch hub 62 includes a tubular portion 62a that is provided on an outer peripheral side and extends toward the engine 1 side. A plurality of drive plates 48a of the clutch 48 are attached, by spline coupling, to an outer periphery of the tubular portion 62a so as to be slidable in the axial direction.

The rotor frame 81 is fixed to the outer periphery of the rotary shaft 44 by welding. The rotor frame 81 includes a tubular portion 81a that is provided on the outer peripheral side. The core 82 is fixed to an outer periphery of the tubular portion 81a.

A plurality of driven plates 48b of the clutch 48 are attached, by spline coupling, to the inner periphery of the tubular portion 81a so as to be slidable in the axial direction. A retainer plate 63 is interposed between the driven plates 48b disposed at an end portion opposite a piston arm 64 and a ring 65 fixed to a groove on the inner periphery of the tubular portion 81a. A thickness of the retainer plate 63 in the axial direction is thicker than that of the driven plate 48b, which prevents the drive plates 48a and the driven plates 48b from falling down.

When engaging pressure is supplied from the hydraulic control valve unit to a piston oil chamber 66, a piston 67 moves toward the engine 1 side while compressing a return spring 68. The clutch 48 is brought into an engaged state by a pressing force transmitted from the piston 67 via the needle bearing 69 and the piston arm 64.

The needle bearing 69 suppresses the piston 67 from rotating together with rotation of the piston arm 64.

The holding member 49 that holds the magnet 52 is attached to the rotor frame 81.

The holding member 49 is fixed, by a press-fitting portion 49a provided on the outer peripheral side, to the outer peripheral side of the tubular portion 81a by press-fitting. The holding member 49 may be fixed to the retainer plate 63 by, for example, press-fitting or welding.

The holding member 49 includes a tubular portion 49b that is provided on the inner peripheral side and extends toward the forward/reverse switching mechanism 30 side. The tubular portion 49b is positioned between the clutch hub 62 and the rotation sensor 47 held by the holder 58 in the radial direction, and the magnet 52 is attached to the inner periphery of the tubular portion 49b. In addition, the magnet 52 may be held by another rotating body without providing the holding member 49.

As described above, the power transmission device 10 according to the present embodiment includes the rotary electric machine 40, the pipe 53 that supplies oil to the rotary electric machine 40, and the intermediate cover 31 that faces the rotary electric machine 40 in the axial direction with the pipe 53 interposed therebtween, and the oil is supplied to the pipe 53 via the intermediate cover 31.

Accordingly, since the oil can be supplied to the pipe 53 via the intermediate cover 31 that faces the rotary electric machine 40 in the axial direction, the protrusion of the pipe 53 to the outer peripheral side of the rotary electric machine 40 as viewed from the axial direction can be suppressed. Therefore, the power transmission device 10 can be miniaturized.

In addition, the power transmission device 10 includes the intermediate member 32 connected to the intermediate cover 31, and the pipe 53 is connected to the intermediate member 32.

In this way, by adopting a configuration in which the oil is supplied from the intermediate cover 31 to the pipe 53 via the intermediate member 32, a direction of the oil passage can be changed by the intermediate member 32. In other words, the intermediate member 32 includes at least the first oil passage and the second oil passage intersecting with the first oil passage. Therefore, a degree of freedom in designing various members can be increased, for example, the pipe 53 can be made into a simple shape without being bent in the middle. Since the degree of freedom in designing various members is increased, the miniaturization of the power transmission device 10 is facilitated.

In addition, the power transmission device 10 includes the seal ring 33 that seals between the intermediate cover 31 and the intermediate member 32. The intermediate member 32 includes: the regulating portion 32a that is in contact with the surface of the intermediate cover 31; the seal ring groove 32b that is adjacent to the regulating portion 32a and holds the seal ring 33; and the tip end portion 32c that is adjacent to the seal ring groove 32b. The intermediate cover 31 includes the accommodation hole 31b that accommodates the seal ring 33. The tip end portion 32c is accommodated in the accommodation hole 31b.

For example, it is also considered that the seal ring 33 is held by providing a counterbore in the intermediate cover 31, but in that case, a length in the axial direction of a configuration that holds the seal ring 33 is increased. Therefore, as a result, a length of the intermediate cover 31 in the axial direction, that is, a thickness of the intermediate cover 31 may be increased. In contrast, the thickness of the intermediate cover 31 can be reduced by providing the tip end portion 32c that holds the seal ring 33 in the intermediate member 32.

The seal surface 31d of the inner wall of the accommodation hole 31b that is in contact with the seal ring 33 is an inclined surface.

Accordingly, not only the inlet portion of the accommodation hole 31b but also the entire portion up to the seal surface 31d with which the seal ring 33 is in contact is made into an inclined surface, so that the seal ring 33 can be prevented from being damaged when attaching the seal ring 33.

In addition, the pipe 53 has an arc shape, and the power transmission device 10 includes the chain 57 that extends from the inner peripheral side of the pipe 53 to the outer peripheral side of the pipe 53 via the notch portion 53b of the pipe 53.

Since there is no need to provide the pipe 53 over the entire periphery in the peripheral direction, the notch portion 53b of the pipe 53 can be enlarged. Accordingly, the chain 57 can be disposed so as to pass through the notch portion 53b, and the sprocket 55, a part of the chain 57, and the like can be disposed on the inner peripheral side of the pipe 53. Therefore, the overall size of the power transmission device 10 can be suppressed.

In addition, the power transmission device 10 includes the partition wall portion 35 provided between the pipe 53 and the chain 57 so as to surround the chain 57.

Accordingly, the oil flowing down from the pipe 53 and the housing 41 can be prevented from adhering to the chain 57, and the driving efficiency of the chain 57 can be prevented from being reduced due to the agitating resistance of the oil.

While an embodiment of the invention has been described, the embodiment is merely one of application examples of the invention, and does not intend to limit a technical scope of the invention to a specific configuration according to the embodiment.

For example, in the above-mentioned embodiment, the device is described as the power transmission device 10. However, the device may be a rotary electric machine-mounted device (a device on which a rotary electric machine is mounted) or the like, and the power transmission device 10 may be understood as the rotary electric machine-mounted device.

In the above-mentioned embodiment, the power transmission device 10 is described as the transmission. However, the power transmission device 10 may be a speed reducer, a transmission with a motor (also referred to as a rotary electric machine-mounted device), a speed reducer with a motor (also referred to as a rotary electric machine-mounted device), or the like.

In the above-mentioned embodiment, a case is described in which the liquid to be supplied to the rotary electric machine 40 is oil. However, the liquid to be supplied to the rotary electric machine 40 may be, for example, water, an aqueous solution, or the like.

The present application claims priority under Japanese Patent Application No. 2020-21657 filed to the Japan Patent Office on Feb. 12, 2020, and an entire content of this application is incorporated herein by reference.

The invention claimed is:

1. A device, comprising:
   a rotary electric machine;
   a liquid supply member configured to supply liquid to the rotary electric machine; and
   a facing member facing the rotary electric machine in an axial direction with the liquid supply member interposed therebetween, wherein
   the liquid is supplied to the liquid supply member via the facing member,
   the liquid supply member is an arc-shaped pipe, and
   the device further comprises a chain that extends from an inner peripheral side of the pipe to an outer peripheral side of the pipe via a notch portion of the pipe, and
   a partition wall portion provided between the pipe and the chain so as to surround the chain.

2. The device according to claim 1, further comprising:
   an intermediate member connected to the facing member, wherein
   the liquid supply member is connected to the intermediate member.

3. The device according to claim 2, further comprising:
   a seal ring configured to seal between the facing member and the intermediate member, wherein
   the intermediate member includes:
   a regulating portion in contact with a surface of the facing member;
   a seal ring groove adjacent to the regulating portion and configured to hold the seal ring; and
   a tip end portion adjacent to the seal ring groove,
   the facing member has an accommodation hole configured to accommodate the seal ring, and
   the tip end portion is accommodated in the accommodation hole.

4. The device according to claim 3, wherein
   a seal surface of an inner wall of the accommodation hole that is in contact with the seal ring is an inclined surface.

* * * * *